(12) United States Patent
Carteau

(10) Patent No.: US 6,606,694 B2
(45) Date of Patent: Aug. 12, 2003

(54) WRITE LOGGING IN MIRRORED DISK SUBSYSTEMS

(75) Inventor: Daniel Carteau, Montigny le Bretonneux (FR)

(73) Assignee: Bull HN Information Systems Inc., Billerica, MA (US)

(*) Notice: Subject to any disclaimer, the term of this patent is extended or adjusted under 35 U.S.C. 154(b) by 239 days.

(21) Appl. No.: 09/746,806

(22) Filed: Dec. 22, 2000

(65) Prior Publication Data

US 2002/0083281 A1 Jun. 27, 2002

(51) Int. Cl.⁷ .............................. G06F 12/00
(52) U.S. Cl. .................. 711/162; 711/114; 714/6; 714/20; 709/248; 707/204
(58) Field of Search ................. 711/162, 161, 711/112, 114, 111, 113, 170; 709/246, 248; 707/204; 714/20, 6, 15, 7

(56) References Cited

U.S. PATENT DOCUMENTS 6,108,684 A * 8/2000 DeKoning et al. .......... 709/105
6,173,377 B1 * 1/2001 Yanai et al. ................. 711/162
6,199,074 B1 * 3/2001 Kern et al. .................. 707/204
6,502,205 B1 * 12/2002 Yanai et al. .................... 714/7

* cited by examiner

Primary Examiner—Pierre-Michel Bataille
(74) Attorney, Agent, or Firm—R. E. Hayden; J. H. Phillips; J. S. Solakian (57) ABSTRACT

Disk drives are mirrored through duplication controlled by disk controllers. Each disk controller controls writing to a set of disk drives. A disk write request to one disk controller causes that disk controller to write to one of its disks and to transmit the write request to another controller that in turn writes to its disk. The second controller then acknowledges the write to the first controller, which in turn acknowledges the write to the computer issuing the request. The first controller further logs the writes in a log file. This allows efficient resynchronization after mirroring is broken and reestablished, as well as removing cable length restrictions between controllers.

6 Claims, 7 Drawing Sheets

WRITE LOGGING IN MIRRORED DISK SUBSYSTEMS

FIELD OF THE INVENTION

The present invention generally relates to high availability disk subsystems, and more specifically to mirroring data in such a high availability disk subsystem.

BACKGROUND OF THE INVENTION

Mirroring is the duplication of data on two or more disk drives. It is done primarily for data integrity protection. Originally, files were duplicated. This feature was available in the early 1970's on the Burroughs (now Unisys) 6700 series of computers. Later, entire disk drives were mirrored. Each disk write is duplicated to two or more disks. Reads from the disk(s) can be from either disk. This provided performance benefits in read operations and a small decrease of performances in write operations. Then, if there is a failure of one of the disks, reading can continue uninterrupted from the other disk. This significantly increases the data integrity and availability, and has an important ingredient of on-line transaction systems for a number of years. Availability was further enhanced by utilizing different disk controllers for the mirrored disk drives. Thus, a failure of a mirrored disk drive, its disk controller, the host adapter, or any of the cabling, would not prevent immediate access to the data.

Originally, mirroring was done at the host computer level. The host computer would issue individual write requests to each of the mirrored disks. The host computer would also keep track of which disks are currently available. Software to synchronize mirrored disks or files would also be host computer based.

More recently, mirroring at the disk controller level has been introduced. This eliminates the need for the host computer to handle mirrored disks or files any differently than it does other disks or files. Currently, there are commercial disk subsystems available that support mirroring functions. Typically mirroring works by writing data to each of the mirrored disk drives before acknowledging the write to the computer that issued the write request. Typically again, one disk controller will control the writing of data to both disk drives.

In a high availability disk subsystem, the two (or more) mirrored disks could be controlled by different disk controllers. Thus, mirroring is done in these cases by having the first ("Primary") disk controller write data to a first ("Primary") disk. Meanwhile the primary disk controller transmits the data to be written to the second ("Secondary") disk controller. The secondary disk controller then writes the data to a second ("Secondary") disk drive. Upon completion of this write, the secondary disk controller transmits an acknowledgement to the primary disk controller, which in turn transmits an acknowledgement to the computer when the two disk drives are written.

Some high availability disk subsystems use the same controller to write the data to the two disk drives ("Primary" and "Secondary") but, to be protected against failures, the data to be written is saved also in the cache of the second controller. In case of failure of the first controller during the write operations, the second controller takes the task and resume the operations.

Traditionally, the primary purpose for mirroring databases or disk drives was for data integrity protection and secondary for high availability. Mirroring is also known as Redundant Array of Independent (or Inexpensive) Disks ("RAID") level 1 or RAID level 0/1. Data is immediately available when any single element in a disk subsystem is lost, whether the lost element is a disk controller, a disk drive, or cabling between them and a computer. Other types of data integrity protection, such as RAID levels 3 or 5 have been more popular in recent years due to their lower usage of disk space. However, mirroring is becoming much more attractive due to its simpler design as the cost per megabyte of disk space continues to drop year after year. It is also becoming used in RAID level 1/0 that provides mirroring in conjunction with striping for very high reliability/high performance applications.

Mirroring has other benefits too. It can be used as a tool to facilitate copies of different states of a database. This is accomplished by creating a mirror of a database. After the mirror is operational, it is broken at a particular moment. In this way, the secondary copy is the image of the database at a defined instant in time. A third copy of the database can be created at a different instant in time, etc.

Mirroring can also be utilized as a tool to facilitate backup on tapes. This is accomplished by creating a mirror of a disk or database. When the mirror is operational, it is broken at a specified moment in time. In this way, the disk copy is available to be replicated separated on a tape or a tape library, at the data throughput required. At the end of this operation, the mirror is reestablished, and after the resynchronization phase, a new backup can be initialized.

However, many of these features have some limitations in the prior art because the creation or the resynchronization of a mirror has a negative impact on the performance of the disk subsystem because a full replication of disk volumes is required to create or resynchronize the mirror.

Another problem with mirroring is that the two mirrored disks have to be reasonably close together. With current Fibre Channel technology, the two disks drives must be within 10 km (standard value) of each other. This technology limitation in length is needed for data integrity protection and due also to the fact that storage interfaces work in real time. One problem here is that it would often be preferable to separate the disk controllers and their associated disk drives by longer distances in order to minimize the possibility that a common disaster could take out both.

Another current problem with mirroring is that the primary disk controller typically maintains data transmitted to the secondary disk controller in non volatile memory until acknowledged (battery protected cache). This typically consumes significant amounts of valuable non volatile memory space that RAID disk controllers could utilize for caching.

Another problem that arises in high availability disk subsystems is in backing up and checkpointing data, especially in the form of on-line databases. In the prior art, checkpointing and backing up on-line databases typically adversely impacts performance during the time that the backup is being taken. One reason for this is that user accesses to the database must be overlapped with backup accesses to it. Also, it is difficult to get a completely consistent snap-shot copy of an on-line database without shutting down access to the database while the copy is being made. It would thus also be advantageous to provide a mechanism for checkpointing, snap shotting, and backing up files, most particularly online databases, without negatively impacting performance during the time that the backup is being taken.

For these reasons, and for other reasons that will become apparent in this disclosure, an improved method of mirroring disks and databases is beneficial.

Figure 1:
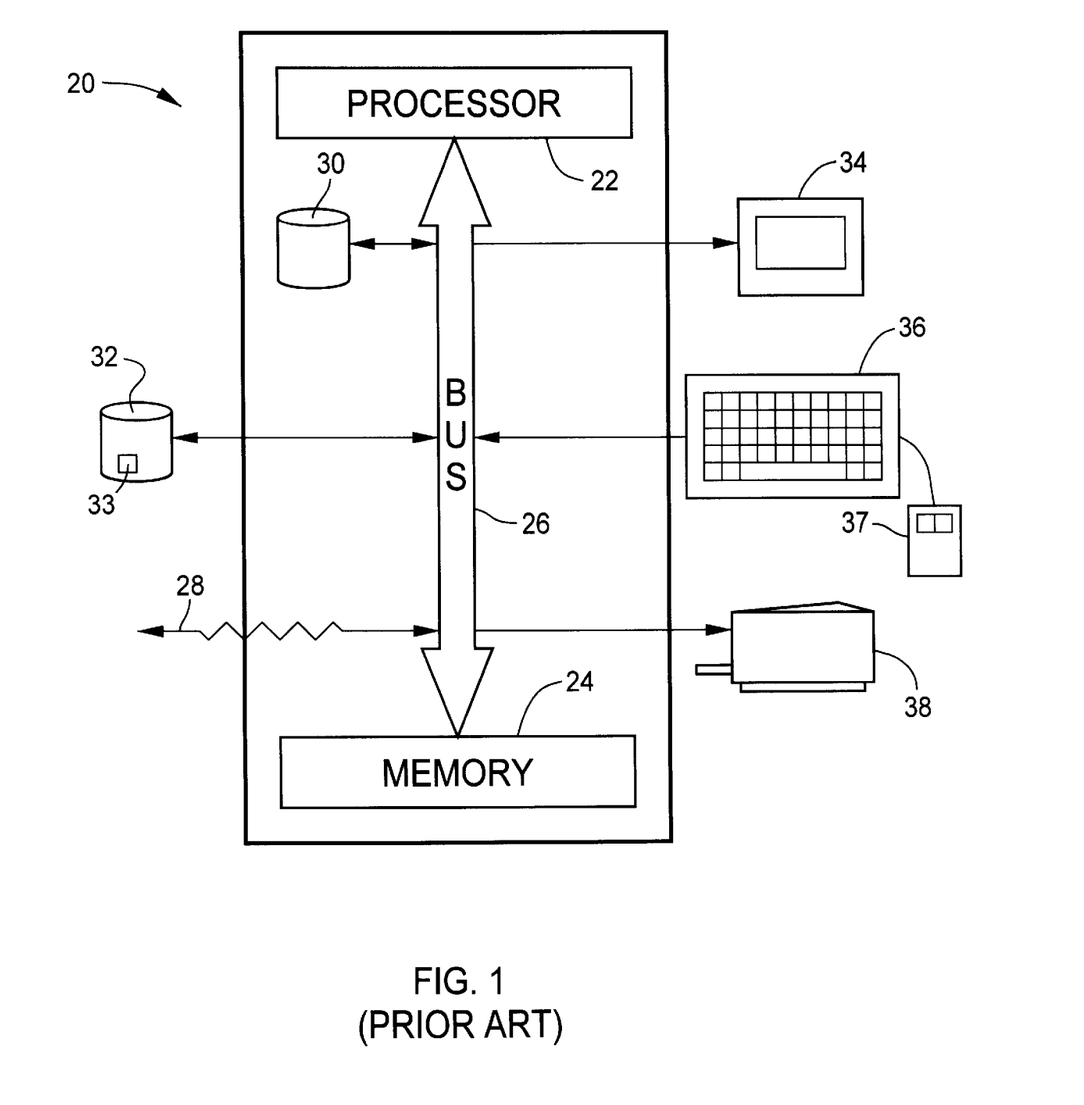
FIG. 1 is a block diagram illustrating a General Purpose Computer in a data processing system.

FIG. 1 is a block diagram illustrating a General Purpose Computer 20 in a data processing system. The General Purpose Computer 20 has a Computer Processor 22, and Memory 24, connected by a Bus 26. Memory 24 is a relatively high speed machine readable medium and includes Volatile Memories such as DRAM, and SRAM, and Non-Volatile Memories such as, ROM, FLASH, EPROM, and EEPROM. Also connected to the Bus are Secondary Storage 30, External Storage 32, output devices such as a monitor 34, input devices such as a keyboard 36 (with mouse 37), and printers 38. Secondary Storage 30 includes machine-readable media such as hard disk drives (or DASD) and disk sub-systems. External Storage 32 includes machine-readable media such as floppy disks, removable hard drives, magnetic tapes, CD-ROM, and even other computers, possibly connected via a communications line 28. The distinction drawn here between Secondary Storage 30 and External Storage 32 is primarily for convenience in describing the invention. As such, it should be appreciated that there is substantial functional overlap between these elements. Computer software such as data base management software, operating systems, and user programs can be stored in a Computer Software Storage Medium, such as memory 24, Secondary Storage 30, and External Storage 32. Executable versions of computer software 33, can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution.

Figure 2:
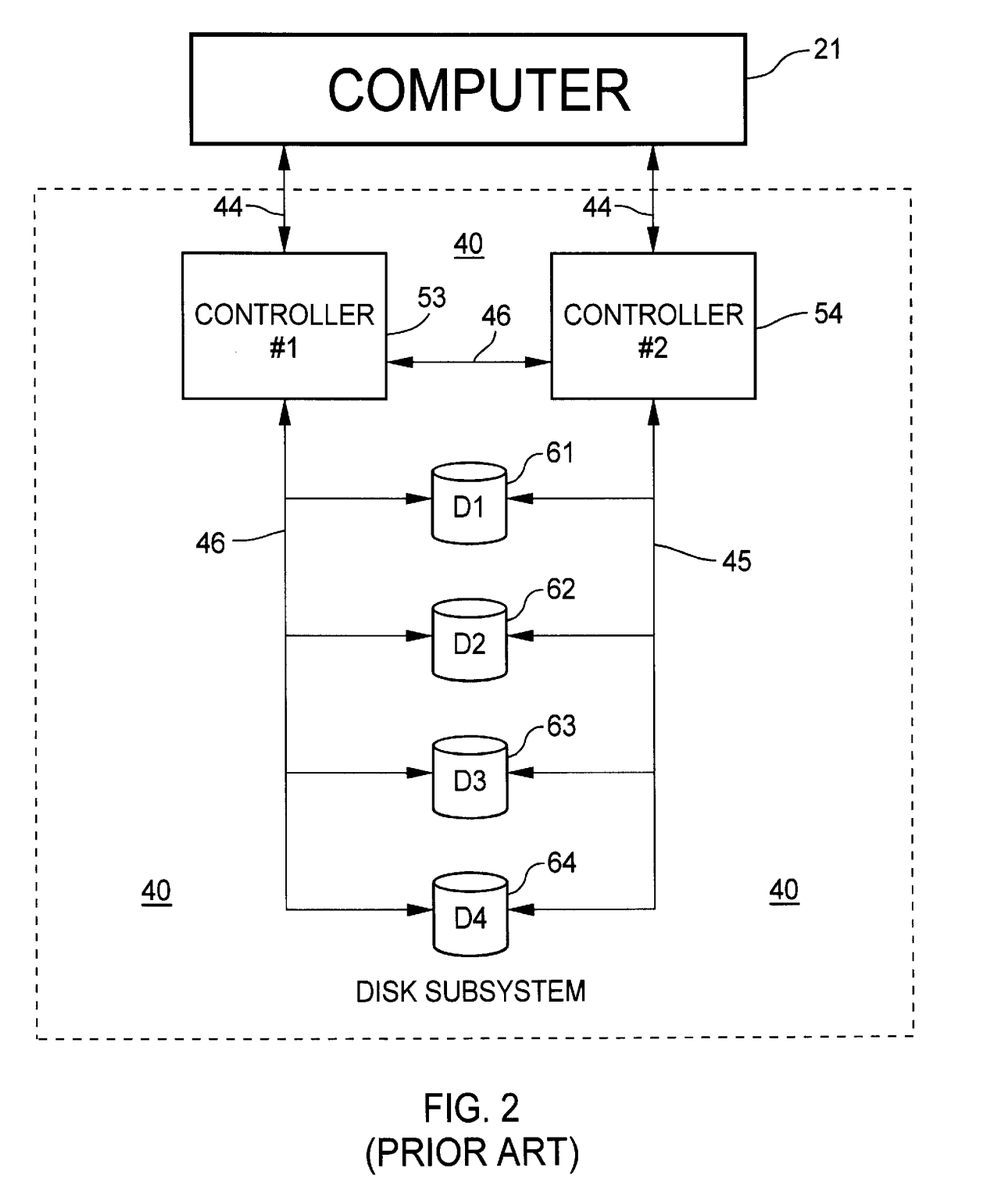
FIG. 2 is a block diagram illustrating a data processing system having a computer and a disk subsystem with two RAID disk controllers to communicate with and control four disk drives.

FIG. 2 is a block diagram illustrating a data processing system 20 having a computer 21 and a disk subsystem 40 with two RAID disk controllers 53, 54 to communicate with and control four disk drives 61, 62, 63, 64. The disk subsystem 40 comprises two RAID disk controllers 53, 54 coupled to four disk drives 61, 62, 63, 64. The computer 21 is bidirectionally coupled 44 to each of the two RAID disk controllers 53.54. Each of the two RAID disk controllers 53, 54 is bidirectionally coupled to 45 and controls each of the four disk drives 61, 62, 63, 64. The two RAID disk controllers 53, 54 are also bidirectionally coupled together 46. This is illustrative of a sample high availability disk subsystem.

In the preferred embodiment, the coupling between the computer 21 and RAID disk controller 53, 54, comprises one or more channels. Two common types of channels 44 in use today are SCSI and Fibre Channel. Other types of computer systems, interconnections, and channels are within the scope of this invention. Note that in a typical case, the computer 21 will typically be multiply connected 44 to each of the two RAID disk controllers 53, 54. Note also that large scale data processing systems will typically include more than one disk subsystem and more than four disks. Additionally, each such RAID disk controller 53, 54 will often communicate with and control more than the four disk drives 61, 62, 63, 64 shown. Two common types of connections in use today are SCSI and Fibre Channel. However, other types of connections are also within the scope of this invention.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

Disk drives are mirrored through duplication controlled by disk controllers. Each disk controller controls writing to a set of disk drives. A disk write request to one disk controller causes that disk controller to write to one of its disks and to transmit the write request to another controller that in turn writes to its disk. The second controller then acknowledges the write to the first controller, which in turn acknowledges the write to the computer issuing the request. The first controller further logs the writes in a log file. This logging allows efficient resynchronization after mirroring is broken and reestablished, as well as removing cable length restrictions between controllers.

In the following description, numerous specific details are set forth to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details have been omitted in as much as such details are not necessary to obtain a complete understanding of the present invention and are within the skills of persons of ordinary skill in the relevant art.

The terms "bus" and "channel" will be used to refer to a plurality of signals or conductors which may be used to transfer one or more various types of information, such as data, addresses, control, or status. Either busses or channels can utilize either serial or parallel technologies. As noted above, the single bus is shown in FIG. 1 is illustrative only, typically being implemented as a plurality of busses.

Figure 3:
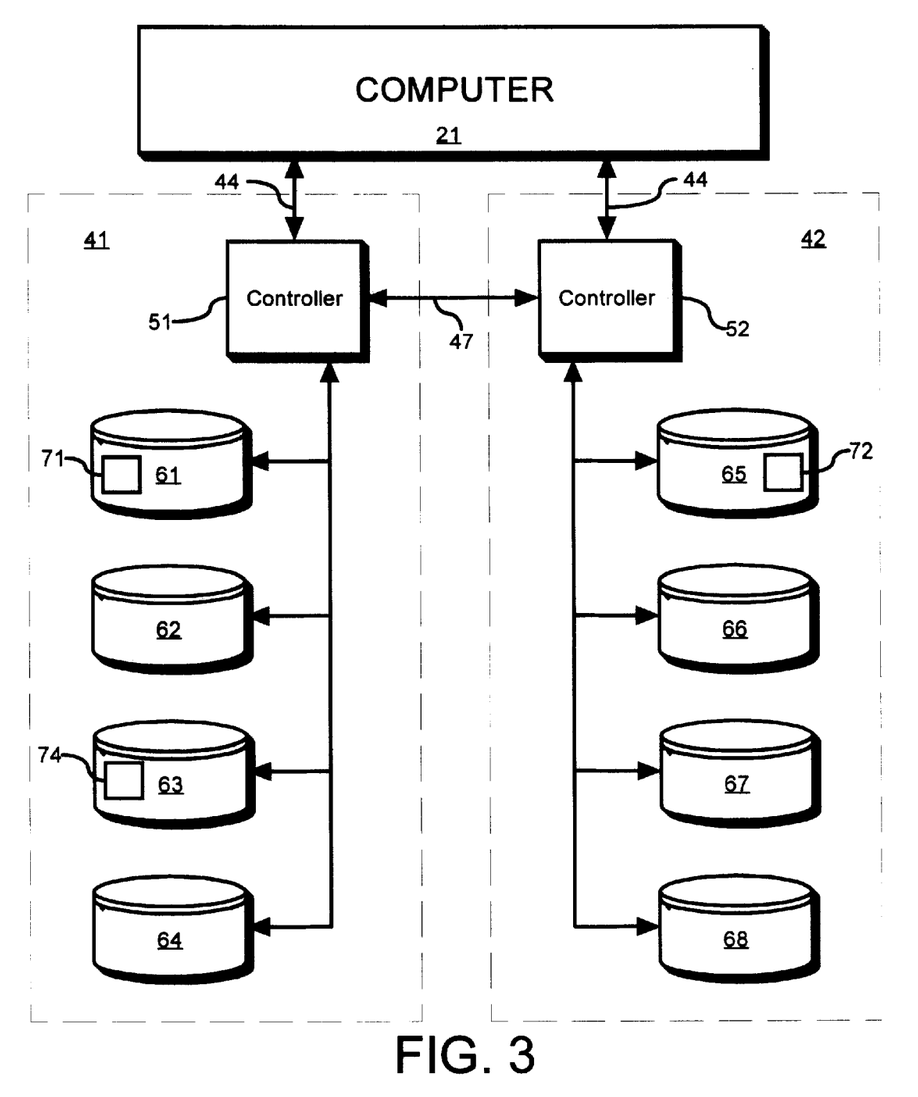
FIG. 3 is a block diagram illustrating a data processing system in accordance with a preferred embodiment of the present invention.

FIG. 3 is a block diagram illustrating a data processing system 20 in accordance with a preferred embodiment of the present invention. The data processing system 20 has a computer 21 and disk subsystems 41, 42 each with one or more RAID disk controllers 51, 52 to communicate with and control eight disk drives 61, 62, 63, 64, 65, 66, 67, 68. In this FIG., a single disk controller 51, 52 is shown in each disk subsystem 41, 42. However, in the preferred embodiment, each disk subsystem 41, 42, contains two or more disk controllers 51, 52 coupled to the disk drives in that disk subsystem 41, 42. The disk controllers 51, 52, in the two disk subsystems 41, 42 are bidirectionally coupled 44 to the computer 21, preferably over one or more channels 44 as disclosed in FIG. 2. The disk controllers 51, 52 are further bidirectionally coupled 47 to the disk controllers 52, 51 in the other disk subsystems 41, 42. The first disk subsystem 41 comprises one or more disk controllers 51 that are bidirectionally coupled to and control the first four disk drives 61, 62, 63, 64. The second disk subsystem 42 comprises one or more disk controllers 52 that are bidirectionally coupled to and control the second four disk drives 65, 66, 67, 68.

The first disk drive 61 controlled by the first disk subsystem disk controllers 51 contains a database 71 that is mirrored 72 on the fifth disk drive 65 controlled by the second disk subsystem disk controllers 52. Hereinafter, the first database 71 will be termed the "Primary" database, and the mirrored copy 72 will be termed the "Secondary" database. This is illustrative only. In particular note that in many cases, databases span multiple disk drives. The present invention is not limited to any specific database configuration on any specific configuration of disk drives or disk controllers. Also note that though the remainder of this disclosure discussed mirroring of databases, RAID levels 1 and 0/1 provide for mirroring of entire disk drives. It should be understood that though this invention supports mirrored databases, it is primarily applicable to mirrored disk drives, which of necessity mirror the databases residing on the mirrored disk drives. It should also be noted that either or both databases 71, 72 may be additionally protected by RAID features such as RAID 5 or RAID 0/1.

The mirroring typically operates by the first disk subsystem disk controllers 51 transmitting all write requests across the link 47 to the second disk subsystem disk controllers 52. Both disk subsystem disk controllers 51, 52, then cause the data being written to be written to the databases 71, 72 on the corresponding two disk drives 61, 65. The second disk subsystem disk controllers 52 will then send an acknowledgement of the write to the first disk subsystem disk controllers 51, which in turn send the write acknowledgement to the computer 21. This guarantees that the write request is not acknowledged to the computer 21 until it has been successfully completed by both disk subsystems 41, 42.

As noted above, it would be advantageous to be able to create duplicate copies of a database, then break the connection between the two copies of the database. The second copy of the database could then be saved to tape or other type of external storage 32. The mirror split and subsequent database save could be at a certain specified time, or by command. After the database save, the two second copy of the database (the one used for the save) could then be resynchronized with the first copy, without the necessity of taking the first database offline. Again, the resynchronization could be done upon operator command.

This problem of breaking the mirroring, and later resynchronizing, is solved by keeping a log file 74 of unmirrored writes on one (or more) of the disk drives 63 in the first disk subsystem 41. When a decision is made to resynchronize the two disk subsystems, or the physical or logical connection 47 between disk subsystems 41, 42, is reestablished, the first disk subsystem disk controllers 51 transmit the previously unmirrored writes from the log file 74 to the second disk subsystem disk controllers 52. The second disk subsystem disk controllers 52 acknowledge these writes when completed to the first disk subsystem disk controllers 51, at which time the first disk subsystem disk controllers 51 mark them as no longer being valid or requiring acknowledgement in the log file 74. In the preferred embodiment, the first disk subsystem disk controllers 51 continue to save writes to the primary database 71 in the log file 74 until the second disk subsystem disk controllers 52 catch up to the first disk subsystem disk controllers 51. At that point, the two database copies 71, 72, are again identical and synchronized.

In the preferred embodiment, the log file 74 will reside on one or more unused disks, such as "hot" backup disks. However, other configurations are within the scope of this invention, including allocation of the log file 74 as a file on a disk currently in use (but preferably not mirrored).

In the prior art, the connection 47 between the first disk subsystem disk controllers 51 and the second disk subsystem disk controllers 52 is limited in length. One reason for this is that the longer the cable length, the longer it takes the second disk subsystem disk controllers 52 to acknowledge writes to the first disk subsystem disk controllers 51. This in turn increases the time it takes to acknowledge the writes to the computer 21. This limitation is removed in the present invention by acknowledging the writes to the computer 21 when written successfully by the first disk subsystem disk controllers 51 to both the primary database copy 71 and the log file 74. The corresponding entry in the log file 74 is deleted when acknowledged by the second disk subsystem disk controllers 52 as having been written to the secondary database copy 72.

Figure 4:
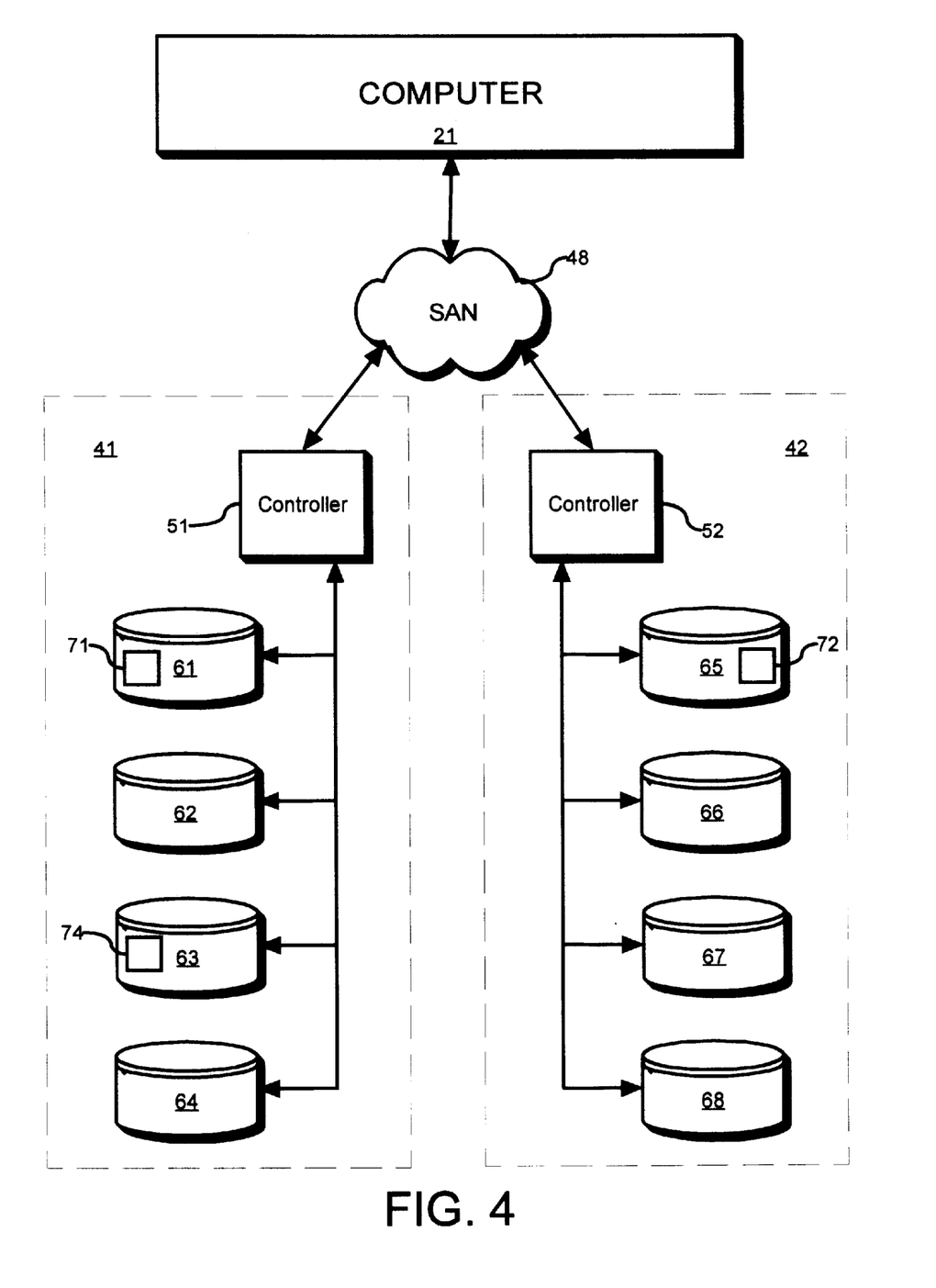
FIG. 4 is identical to FIG. 5 except that the two disk controllers are coupled to the computer via a Storage Area Network (SAN)
Figure 5:
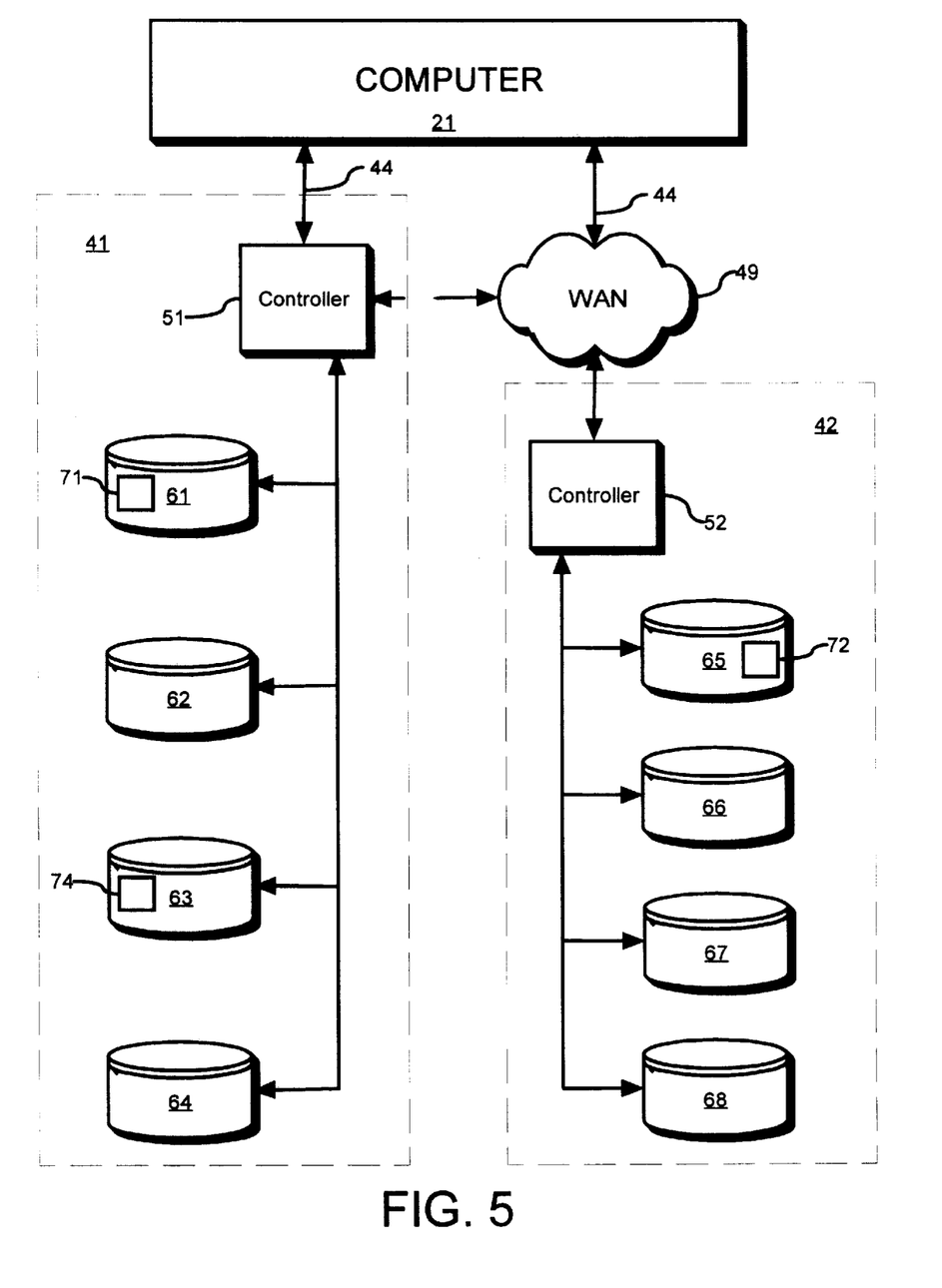
FIG. 5 is a block diagram illustrating a data processing system in accordance with an alternate embodiment of the present invention.

FIG. 4 is identical to FIG. 5 except that the two disk subsystem disk controllers 51, 52, are coupled to the computer 21 via a Storage Area Network (SAN) 48.

FIG. 5 is a block diagram illustrating a data processing system 20 in accordance with an alternate embodiment of the present invention. It is similar to FIG. 4 except that the second disk subsystem disk controllers 52 are coupled to the first disk subsystem disk controllers 51 and the computer 21 via a Wide Area Network 49 (WAN). This is infeasible in the prior art due to cable length restrictions. However, as noted in the description of FIG. 3, this limitation is removed by acknowledging writes to the computer 21 after they are complete to the primary database copy 71 and the log file 74. This has significant advantages over the prior art when providing for disaster recovery, since the first disk subsystem disk controllers 51, and its associated disk drives 61, 62, 63, 64, can be placed a significant distance from the second disk controller 52 and its associated disk drives 65, 66, 67, 68. The WAN 49 can be an internal Local Area Network (LAN), such as Ethernet or fiber. Even more importantly, the two disk subsystems no longer have to even be located in the same geographical area. One alternative is to use an ATM link for the WAN 49. Another alternative is, with proper security, to utilize the Internet as the WAN 49. Other equivalent or similar configurations or technologies are within the scope of this invention.

Figure 6:
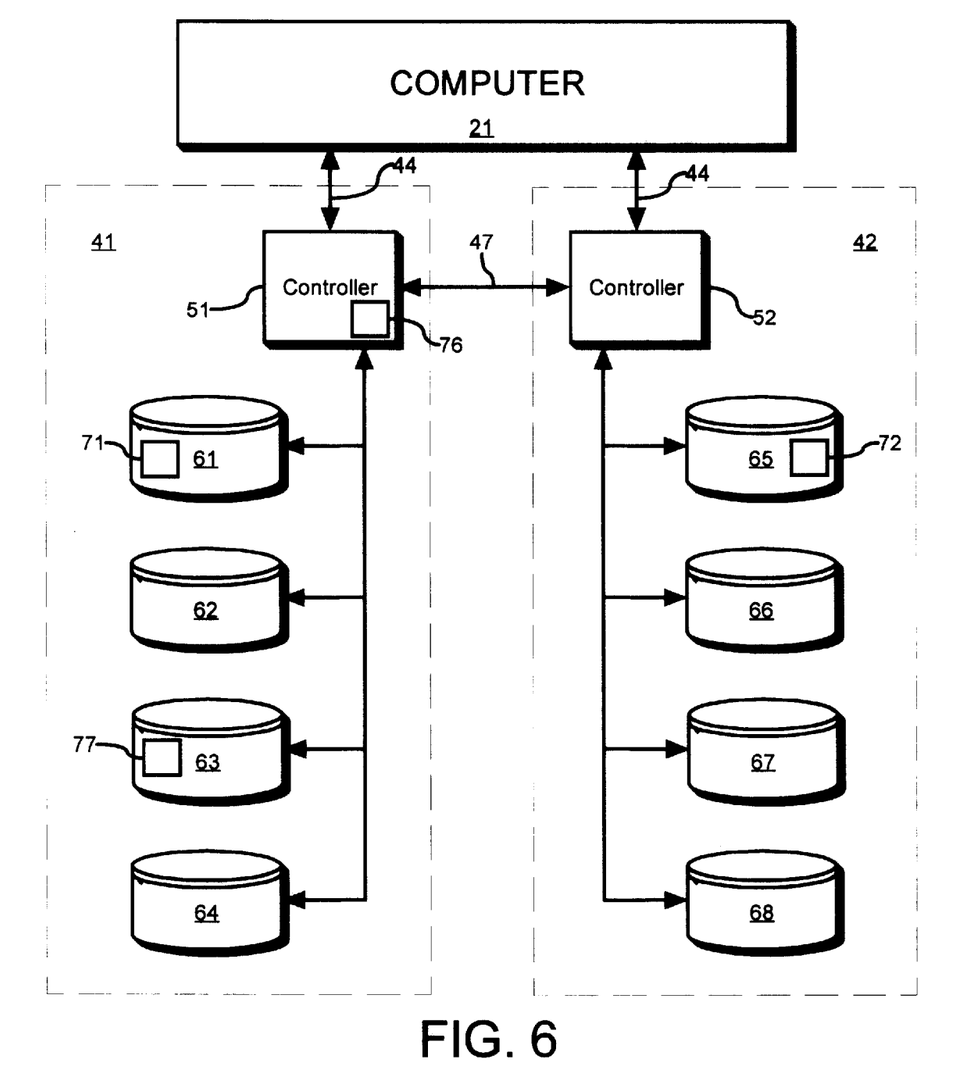
FIG. 6 is a block diagram illustrating a data processing system in accordance with an alternate embodiment of the present invention.

FIG. 6 is a block diagram illustrating a data processing system 20 in accordance with an alternate embodiment of the present invention. It is similar to FIG. 3 except that the log file 74 is divided into two parts. One portion of the log file 74 in FIG. 3 is the log file data file 77 that contains the records that will ultimately be mirrored in the secondary database 72. It again typically is stored on one of the disk drives 63 controlled by the first disk subsystem disk controllers 51. Additionally, pointers 76 are maintained to these records in a log file pointer buffer 76. The log file pointer buffer 76 is preferably maintained in the memory of the first disk controller 51. However, a non-volatile copy of the log file pointer buffer 76 can be written to one of the disk drives 61, 62, 63, 64, controlled by that disk subsystem disk controller 51.

Figure 7:
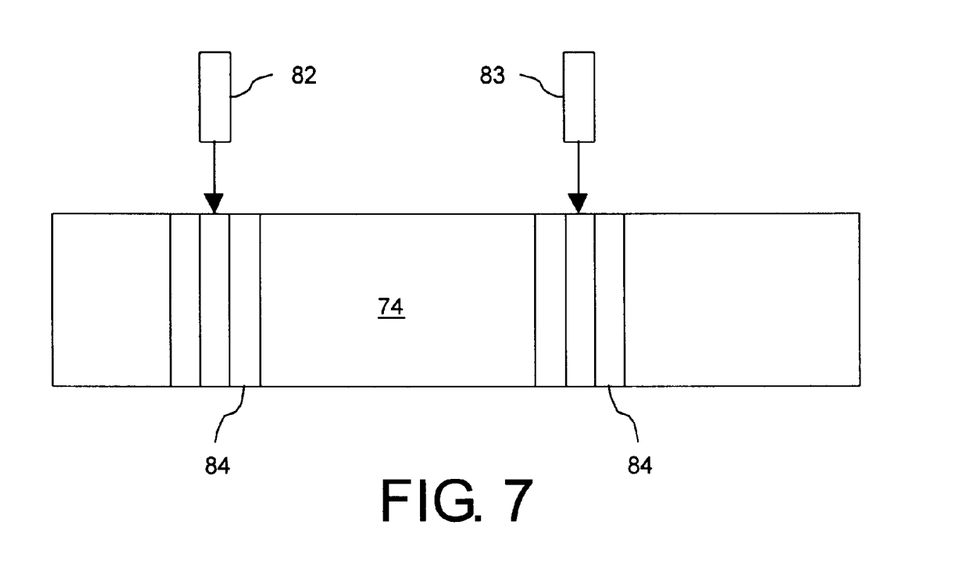
FIG. 7 is a block diagram illustrating the log file shown in FIG. 3, in accordance with a preferred embodiment of the present invention.

FIG. 7 is a block diagram illustrating the log file 74 shown in FIG. 3, in accordance with a preferred embodiment of the present invention. The log file 74 contains a plurality of records organized in a "round robin" or circular buffer form. There are two pointers to the circular buffer. A "Last" pointer 82 points at either the last record inserted into the circular buffer, or at the next record after that last record inserted. There is also a "First" pointer 83 that points at either the first unacknowledged record, or at the last acknowledged record in the circular buffer. The use of circular buffers is well known in the prior art. While a circular buffer is utilized in the preferred embodiment, other equivalent buffering techniques are also within the scope of the present invention, such as the use of double buffering.

When a write of the database 71, 72 is performed, and the two copies of the database 71, 72 are not synchronized, the data written to the primary copy of the database 71 is written into the circular buffer utilizing the Last pointer, which is adjusted correspondingly. When a write is acknowledged to the secondary copy of the database by the second controller 52, the First pointer is adjusted accordingly. When the Last pointer catches up to the First pointer, the two copies of the database 71, 72 are synchronized. Each record in the circular buffer contains three pieces of information: the address in the database 71, 72 at which it is to be written, the size of the data to be written, and the data itself.

Figure 8:
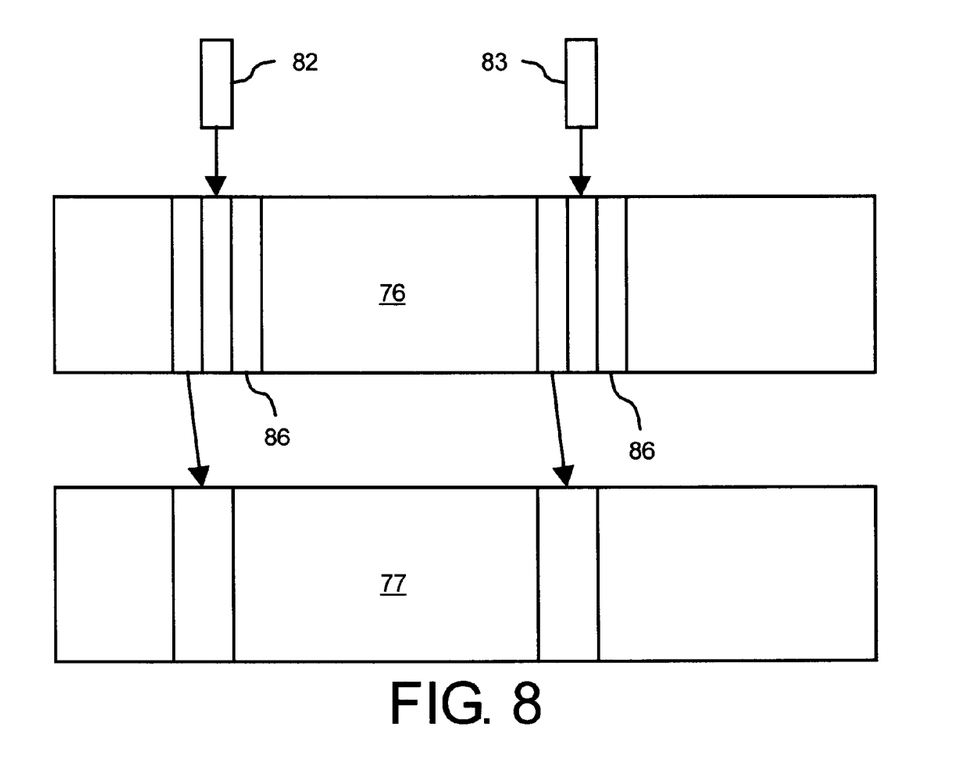
FIG. 8 is a block diagram illustrating the log file pointer buffer and log file data file shown in FIG. 6, in accordance with an alternate embodiment of the present invention.

FIG. 8 is a block diagram illustrating the log file pointer buffer 76 and log file data file 77 shown in FIG. 6, in accordance with an alternate embodiment of the present invention. In this embodiment, the pointer and length information are separated from the actual database information this is to be mirrored. As in FIG. 7, a First pointer addresses either the first unacknowledged set of write information, or the last acknowledged set of write information. The Last pointer 82 addresses either the last unacknowledged set of write information, or the first space for new unacknowledged set of write information.

The log file pointer buffer 76 contains information required to identify where the data to be mirrored will be stored in the secondary database 72, where the data to be mirrored is stored in the log file data file 77, and how much data is involved in the corresponding write request. The data stored in the log file data file 77 can be stored on the appropriate disk drive 63 in the same format as it will be stored in the secondary database 72. For example, if the unit being written is a track of data, a track is stored in the log file data file 77, then read from that log file data file 77 and transmitted to the secondary controller 52 for writing to the secondary database 72.

In one embodiment, each entry in the log file pointer buffer 76 contains a pointer to the corresponding data in the log data file 77, an address for writing in the secondary database 72, and the amount of data to be written. In another embodiment, each entry in the log file pointer buffer 76 corresponds to the standard unit of writing data to the secondary database 72, such as a track of data. Thus, the position of the entry in the log file pointer buffer 76 implicitly identifies the position of the corresponding data in the log file data file 77. Each entry in the log file pointer buffer 76 would at a minimum contain the address at which the corresponding data in the log file data file 77 will be ultimately written in the secondary database 72. Each entry may also contain the number of contiguous standard units of writing data in the corresponding write request. One alternative to this is to mark each entry in the log file pointer buffer 76 with a "First" and "Last" flag in order to implicitly identify the length of each write request. Other equivalent organizations are also within the scope of this invention. In the case of out of order acknowledgements, such as when communicating over the Internet, an "Acknowledged" flag can also be utilized. The Last pointer 82 is then only updated for acknowledged sets of data. One advantage of these embodiments is that multiple write requests to the log file data file 77 can be buffered up and written in larger blocks. For example if the standard unit of writing data to the secondary database 72 is a sector, multiple contiguous sectors, or even an entire track, may be written at the same time, without significant regard to where the data from one write request ends and the data for the next write request begins.

In the preferred embodiment, logging can be turned on and off by commands from the computer 21 operator or operating system. Similarly, the mirror can be broken and reestablished and resynchronized through commands from the computer 21 operator or operating system.

The use of delayed mirroring of disk files, as shown herein, provides a number of benefits. One benefit is that it lifts cable length limitations between disk subsystems 41, 42. Another benefit is that it provides a mechanism to take check points, snap shots, and/or backups of data files (most notably online data bases) without adversely impacting online operation. In such operation, mirroring is broken, the secondary disk drive or file is copied, then the two mirrored disk drives or files are resynchronized. This can be done repeatedly without adversely impacting performance. It can be done either automatically, or under operator command.

Those skilled in the art will recognize that modifications and variations can be made without departing from the spirit of the invention. Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A data processing system comprising:
  a first disk subsystem, comprising:
    a first disk subsystem disk controller;
    a first disk subsystem first disk drive bidirectionally coupled to and controlled by the first disk subsystem disk controller and containing a first copy of a first data file; and
    a first disk subsystem second disk drive bidirectionally coupled to and controlled by the first disk subsystem disk controller and containing a log file; and
  a second disk subsystem bidirectionally coupled to the first disk subsystem, comprising:
    a second disk subsystem disk controller; and
    a second disk subsystem first disk drive bidirectionally coupled to and controlled by the second disk subsystem disk controller and containing a second copy of the data file;
  wherein:
    the first disk subsystem and the second disk subsystem have a first mode of operation and a second mode of operation;
    a write of a block of data to the first data file in the first mode of operation comprises:

writing the block of data to the first disk subsystem first disk drive, transmitting the block of data to the second disk subsystem without the block of data being read from the log file; and writing the block of data to the second disk subsystem first disk drive after being received from the first disk subsystem; and a write of the block of data to the first data file in the second mode of operation comprises:

writing the block of data to the first disk subsystem first disk drive, writing the block of data to the log file;

reading the block of data from the log file;

transmitting the block of data to the second disk subsystem after the block of data is read from the log file; and writing the block of data to the second disk subsystem first disk drive after being received from the first disk subsystem;

wherein the log file comprises:

an index containing a plurality of disk addresses; and a data file comprising a plurality of records each containing a block of data to be stored in the first disk file; and each disk address in the index corresponds to one of the plurality of records in the data file; and wherein data records are written into the log file utilizing a second pointer and read from the log file utilizing a first pointer in a round robin manner; and wherein when transferring from the second mode of operation to the first mode of operation, the first mode of operation is entered when the first pointer catches up to the second pointer.

2. The data processing system in claim 1 wherein:

the log file comprises a plurality of records, wherein each of the plurality of records comprises:

an address for storing a block of data in the first disk file; and the block of data to be stored in the first disk file.

3. The data processing system in claim 2 wherein:

each of the plurality of records further comprises:

a length of the block of data to be stored in the first disk file.

4. The data processing system in claim 1 wherein:

transfer is made from the first mode of operation to the second mode of operation in response to an operator command.

5. The data processing system in claim 1 wherein:

transfer is made from the first mode of operation to the second mode of operation in a computer scheduled basis.

6. The data processing system in claim 1 wherein:

the first disk subsystem is physically separated from the second disk subsystem by more than 10 km.

\* \* \* \* \*